(12) United States Patent
Christensen et al.

(10) Patent No.: US 7,167,479 B2
(45) Date of Patent: Jan. 23, 2007

(54) MULTI-CHASSIS BROADCAST ROUTER HAVING A COMMON CLOCK

(75) Inventors: Carl L. Christensen, South Jordan, UT (US); David Lynn Bytheway, South Jordan, UT (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/518,580

(22) PCT Filed: Jun. 17, 2003

(86) PCT No.: PCT/US03/19114

§ 371 (c)(1),
(2), (4) Date: Dec. 21, 2004

(87) PCT Pub. No.: WO04/002089

PCT Pub. Date: Dec. 31, 2003

(65) Prior Publication Data

US 2005/0175017 A1    Aug. 11, 2005

Related U.S. Application Data

(60) Provisional application No. 60/390,846, filed on Jun. 21, 2002.

(51) Int. Cl.
*H04L 12/56* (2006.01)

(52) U.S. Cl. .................. 370/401; 370/219; 370/422

(58) Field of Classification Search ............... 370/422, 370/401, 463, 396, 503, 216–222; 713/400
See application file for complete search history.

(56) References Cited

U.S. PATENT DOCUMENTS

| | | | |
|---|---|---|---|
| 5,325,358 A * | 6/1994 | Goeldner | 370/219 |
| 5,396,491 A | 3/1995 | Newman | |
| 5,914,953 A | 6/1999 | Krause et al. | |
| 5,920,704 A | 7/1999 | Olnowich et al. | |
| 6,363,078 B1 | 3/2002 | Garcia et al. | |
| 6,754,171 B1 * | 6/2004 | Bernier et al. | 370/216 |
| 2003/0007493 A1 * | 1/2003 | Oi et al. | 370/395.31 |
| 2003/0099247 A1 * | 5/2003 | Toulant et al. | 370/401 |

OTHER PUBLICATIONS

Search Report Dated Oct. 29, 2003.

* cited by examiner

*Primary Examiner*—Brian Nguyen
(74) *Attorney, Agent, or Firm*—Joseph J. Laks; Ronald H. Kurdyla; Brian J. Dorini (57) ABSTRACT

Supportably mounted by each chassis of a multi-chassis broadcast router are primary router matrix cards, redundant router matrix cards and clock-demanding input and output cards. A first master clock resides on the primary router matrix card of a first chassis while a second master clock resides on the redundant router matrix card of a second chassis. Each master clock is configured to provide a respective common clock signal to all of the input and output cards of the first and second chassis. Control logic determines whether the first master clock or the second master clock issues the common clock signal.

13 Claims, 4 Drawing Sheets

MULTI-CHASSIS BROADCAST ROUTER HAVING A COMMON CLOCK

CROSS REFERENCE

This application claims the benefit, under 35 U.S.C. § 365 of International Application PCT/US03/19114, filed Jun. 17, 2003, which was published in accordance with PCT Article 21(2) on Dec. 31, 2003 in English and which claims the benefit of U.S. provisional patent application No. 60/390, 846, filed Jun. 21, 2002.

FIELD OF THE INVENTION

The present invention relates to broadcast routers and, more particularly, to a multi-chassis broadcast router having a common clock.

BACKGROUND OF THE INVENTION

A broadcast router allows each one of a plurality of outputs therefrom to be assigned the signal from any one of a plurality of inputs thereto. For example, an N.times.M broadcast router has N inputs and M outputs coupled together by a router matrix which allows any one of the N inputs to be applied to each one of the M outputs. Many such broadcast routers are comprised of a single chassis which houses plural printed circuit boards, commonly referred to as "cards", interconnected in a wide variety of configurations. Oftentimes, larger broadcast routers are constructed by interconnecting plural smaller broadcast routers. For example, in U.S. patent application Ser. No. 10/518,212, incorporated by reference herein, a fully redundant, linearly expandable 1,280×1,280 broadcast router formed by interconnecting five 256×256 broadcast routers was disclosed. In order for the multi-chassis broadcast router disclosed in that application to function, however, the same clock must be available in each chassis.

SUMMARY OF THE INVENTION

In one embodiment, the present invention is directed to a multi-chassis broadcast router which includes plural chassis, in each of which a routing engine and at least one clock-demanding component reside. Also residing in a first one of the plural chassis is a master clock which is coupled to the clock-demanding components residing in each chassis of the broadcast router. Preferably, an input side of each routing engine of the broadcast router are coupled to one another in a fully connected topology by plural links which are also employed to distribute a common clock signal from the master clock to all of the clock-demanding components.

In another embodiment, the present invention is directed to a multi-chassis broadcast router which includes first and second chassis. Each chassis supportably mounts a primary router matrix card, a redundant router matrix card, at least one clock-demanding input card and at least one clock-demanding output card. A first master clock resides on the primary router matrix card supportably mounted by the first chassis while a second master clock resides on the redundant router matrix card supportably mounted by the second chassis. Each master clock is coupled to each of the clock-demanding input and output cards supportably mounted by the first chassis as well as the clock-demanding input and output cards supportably mounted by the second chassis. The first master clock supplies the clock-demanding cards coupled thereto with a common clock signal while, in the absence of the common clock signal, the second master clock will supply the clock-demanding cards coupled thereto with a redundant common clock signal. Control logic coupled to both the first and second master clocks determines whether the first master clock should issue the common clock signal or whether the second master clock should issue the redundant common clock signal in the absence of the common clock signal.

DETAILED DESCRIPTION

Figure 1:
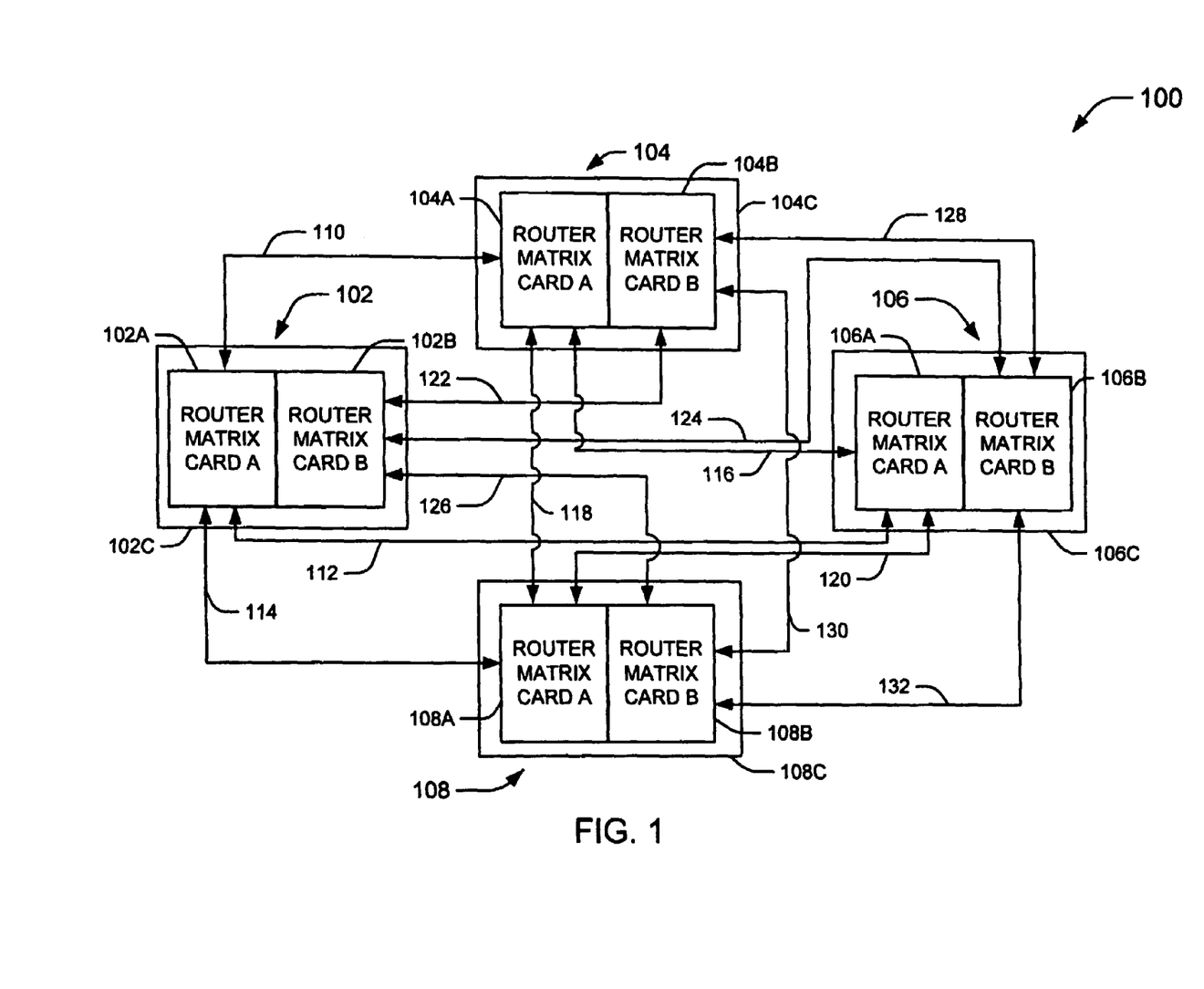
FIG. 1 is a block diagram of a fully redundant, linear expandable broadcast router.

Referring first to FIG. 1, a multi-chassis broadcast router 100 configured such that, in accordance with one aspect of the teachings of the present invention, each chassis thereof shares a common clock, will now be described in greater detail. As disclosed herein, the broadcast router 100 is a fully redundant, linearly expandable broadcast router. It should be clearly understood, however, that it is fully contemplated that other types of multi-chassis broadcast routers besides the specific type of multi-chassis broadcast router disclosed herein may also be configured to share a common clock. It should be further understood that the teachings of the present invention are equally applicable to broadcast routers configured to include plural broadcast router components housed within a common chassis.

As may now be seen, the multi-chassis, fully redundant, linearly expandable broadcast router 100 is comprised of plural broadcast router components, each housed within a respective chassis, coupled to one another to form the larger fully redundant linearly expandable broadcast router 100. Each broadcast router component is a discrete router device which includes a first (or "primary") router matrix card and a second (or "redundant") router matrix card. Thus, each broadcast router component has first and second routing engines, one residing on each of the primary-and-redundant router matrix cards. As will be more fully described below, each one of the first and second routing engines of a broadcast router component receives, at an input side thereof, the same N input digital audio data streams and places, at an output side thereof, the same M output digital audio data streams. As disclosed herein, each of the broadcast router components used to construct the multi-chassis, fully redundant, linearly expandable broadcast router are N×M sized broadcast routers. However, it is fully contemplated that the multi-chassis, fully redundant, linearly expandable broadcast router 100 could instead be constructed of broadcast router components of different sizes relative to one another.

As further disclosed herein, the multi-chassis, fully redundant, linearly expandable broadcast router 100 is formed by coupling together first, second, third and fourth broadcast router components 102, 104, 106 and 108, each of which is housed in a discrete chassis. Of course, the present disclosure of the multi-chassis, fully redundant, linearly expandable broadcast router 100 as being formed of four broadcast router components 102, 104, 106 and 108 is purely by way of example. Accordingly, it should be clearly understood that a multi-chassis, fully redundant, linearly expandable broadcast router constructed in accordance with the teachings of the present invention may be formed using various other numbers of broadcast router components. As may be seen in FIG. 1, the first, second, third and fourth broadcast router components 102, 104, 106 and 108 which, when fully connected in the manner disclosed herein, collectively form the multi-chassis, fully redundant, linearly expandable broadcast router 100, are housed in respective chassis. In the alternative, of course, the first, second, third and fourth broadcast router components 102, 104, 106 and 108 may instead be housed together in a common chassis. Further, while, as previously set forth, each one of the first, second, third and fourth broadcast router components 102, 104, 106 and 108 may have different sizes relative to one another or, in the alternative, may all have the same N×M size, one size that has proven suitable for the uses contemplated herein is 256×256. Finally, a suitable configuration for the multi-chassis fully redundant, linear expandable broadcast router 100 would be to couple five broadcast router components, each sized at 256×256 and housed in a discrete chassis, thereby resulting in a 1,280×1,280 broadcast router.

The first broadcast router component 102 of the multi-chassis, fully redundant, linearly expandable broadcast router 100 includes a chassis 102c, within which a primary router matrix card 102a and a redundant router matrix card 102b used to replace the primary router matrix card 102a in the event of a failure thereof, are supportably mounted. Similarly, the second broadcast router component 104 of the multi-chassis, fully redundant, linearly expandable broadcast router 100 includes a chassis 104c, within which a primary router matrix card 104a and a redundant router matrix card 104b used to replace the primary router matrix card 104a in the event of a failure thereof, are supportably mounted; the third broadcast router component 106 of the multi-chassis, fully redundant, linearly expandable broadcast router 100 includes a chassis 106c, within which a primary router matrix card 106a and a redundant router matrix card 106b used to replace the primary router matrix card 106a in the event of a failure thereof, are supportably mounted; and the fourth broadcast router component 108 of the multi-chassis, fully redundant, linearly expandable broadcast router 100 includes a chassis 108c, within which a primary router matrix card 108a and a redundant router matrix card 108b used to replace the primary router matrix card 108a in the event of a failure thereof, are supportably mounted. Of course, the designation of each of the router matrix cards 102b, 104b, 106b and 108b as a redundant matrix card for use as a backup for the router matrix cards 102a, 104a, 106a and 108a, respectively, in the event of a failure thereof is purely arbitrary and it is fully contemplated that either one of a router matrix card pair residing within a broadcast router component may act as a backup for the other of the router matrix pair residing within that broadcast router component.

While each of the broadcast router components 102, 104, 106 and 108 include a primary and redundant router matrix cards, as will be more full described below, the primary router matrix card for a broadcast router component may or may not be generally identical to the redundant router matrix card for that broadcast router component. More specifically, for the first broadcast router component 102, the primary router matrix card 102a is structured differently from the redundant router matrix card 102b. Similarly, for the second broadcast router component 104, the primary router matrix card 104a is structured differently from the redundant router matrix card 104b. For the third and fourth broadcast router components, however, the primary router matrix cards 106a and 108a are generally identical to the redundant router matrix cards 106b and 108b, respectively. It should be noted, however, that for each of the broadcast router components 102, 104, 106 and 108, however, the routing engine residing on the primary router matrix card is generally identical to the routing engine residing on the redundant router matrix card.

As may be further seen in FIG. 1, the primary router matrix card 102a of the first broadcast router component 102, the primary router matrix card 104a of the second broadcast router component 104, the primary router matrix card 106a of the third broadcast router component 106 and the primary router matrix card 108a of the fourth broadcast router component 108 are coupled together in a first arrangement of router matrix cards which conforms to a fully connected topology. Similarly, the redundant router matrix card 102b of the first broadcast router component 102, the redundant router matrix card 104b of the second broadcast router component 104, the redundant router matrix card 106b of the third broadcast router component 106 and the redundant router matrix card 108b of the fourth broadcast router component 108 are coupled together in a second arrangement which, like the first arrangement, conforms to a fully connected topology. In a fully connected topology, each router matrix card of an arrangement of router matrix cards is coupled, by a discrete link, to each and every other router matrix card forming part of the arrangement of router matrix cards.

Thus, for the first arrangement of router matrix cards, first, second and third bi-directional links 110, 112 and 114 couples the primary router matrix card 102a residing within the chassis 102c of the first broadcast router component 102 to the primary router matrix card 104a residing within the chassis 104c of the second broadcast router component 104, the primary router matrix card 106a residing within the chassis 106c of the third broadcast router component 106 and the primary router matrix card 108a residing within the chassis 108c of the fourth broadcast router component 108, respectively. Additionally, fourth and fifth bi-directional links 116 and 118 couple the primary router matrix card 104a residing within the chassis 104c of the second broadcast router component 104 to the primary router matrix card 106a residing within the chassis 106c of the third broadcast router component 106 and the primary router matrix card 108a residing within the chassis 108c of the fourth broadcast router component 108, respectively. Finally, a sixth bi-directional link 120 couples the primary router matrix card 106a residing within the chassis 106c of the third broadcast router component 106 to the primary router matrix card 108a residing within the chassis 108c of the fourth broadcast router component 108.

Similarly, for the second arrangement of router matrix cards, first, second and third bi-directional links 122, 124 and 126 couples the redundant router matrix card 102b residing within the chassis 102c of the first broadcast router component 102 to the redundant router matrix 104b residing within the chassis 104c of the second broadcast router component 104, the redundant router matrix card 106b residing within the chassis 106c of the third broadcast router component 106 and the redundant router matrix card 108b residing within the chassis 108c of the fourth broadcast router component 108, respectively. Additionally, fourth and fifth bi-directional links 128 and 130 couple the redundant router matrix card 104b residing within the chassis 104c of the second broadcast router component 104 to the redundant router matrix card 106b residing within the chassis 106c of the third broadcast router component 106 and the redundant router matrix card 108b residing within the chassis 108c of the fourth broadcast router component 108, respectively. Finally, a sixth bi-directional link 132 couples the redundant router matrix card 106b residing within the chassis 106c of the third broadcast router component 106 to the redundant router matrix card 108b residing within the chassis 108c of the fourth broadcast router component 108.

Figure 2:
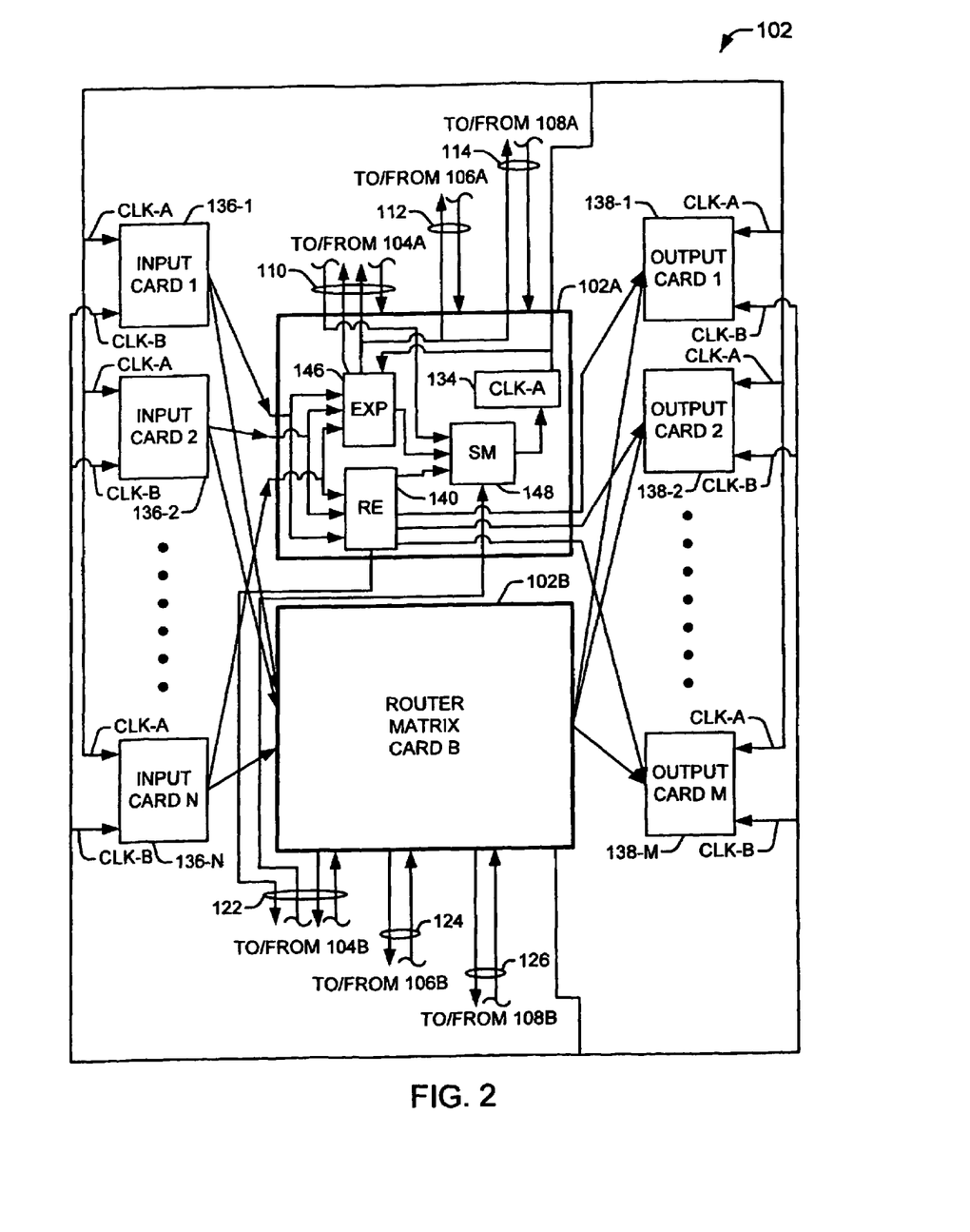
FIG. 2 is an expanded block diagram of a first broadcast router component of the fully redundant, linearly expandable broadcast router of FIG. 1.

The first, second, third and fourth broadcast router components 102, 104, 106 and 108 will now be described in greater detail. FIG. 2 shows the first broadcast router component 102. As previously set forth, the first broadcast router component 102 includes a primary router matrix card 102a and a redundant router matrix card 102b, each of which are slideably received within and supportably mounted by the chassis 102c (not shown in FIG. 2) of the first broadcast router component 102. Also slideably received within and supportably mounted by the chassis 102 are input cards 136-1 through 136-N and output cards 138-1 through 138-M. Each input card 136-1 through 136-N is coupled to the primary router matrix card 102a and the redundant router matrix card 102b. Likewise, each output card 138-1 through 138-M is coupled to the primary router matrix card 102a and the redundant router matrix card 102b. Of course, while discrete input and output cards 136-1 through 136-N and 138-1 through 138-M are shown in FIG. 2, it should be clearly understood that, if desired, the functionality residing on both the input and output cards card, for example, the input card 136-1 and the output card 138-1 may instead be placed on a single input/output ("I/O") card. Furthermore, while FIG. 2 shows discrete input and output cards 136-1 through 136-N and 138-1 through 138-M, it is fully contemplated that, depending on available space thereon, all or part of the functionality shown as residing on either the input cards, for example, the input card 136-1, the output cards, for example, the output card 138-1, or both, may instead reside on the primary router matrix card 102a, the redundant router matrix card 102b or some combination thereof.

Residing on each input card 136-1 through 136-N is input signal selection circuitry (not shown). The input signal selection circuitry selects, from plural input signals received thereby, an input signal to be passed to both the primary router matrix card 102a and the redundant router matrix card 102b. Typically, the input signal selection circuitry is used to select between an input digital audio data stream conforming to the Audio Engineering Society-11 ("AES-11") standard and an input digital audio data stream conforming to the multichannel digital audio interface ("MADI") standard set forth in the AES-10 standard. In this regard, it should be noted that a MADI input digital audio data stream may contain up to 32 AES digital audio data streams and that each of the inputs to the input selection circuitry would typically contain a single AES digital audio data stream which had previously been extracted from a MADI input digital audio data stream by extraction circuitry (also not shown). Of course, such a configuration is purely exemplary and it is fully contemplated that input signal selection circuitry is not necessary if the first broadcast router component 102 is instead configured to receive, as inputs thereto, a single type of digital audio data.

As the input selection circuitry residing on each one of the input cards 136-1 through 136-N selects an input digital audio stream to be transmitted to each one of the primary and redundant router matrix cards 102a and 102b, each one of the primary and redundant router matrix cards 102a and 102b receive, from the input cards 136-1 through 136-N, input digital audio signals 1 through N, respectively. Residing on the primary router matrix card 102a are a routing engine ("RE") 140, a transmission expansion port ("EXP") 146, first, second and third receiving expansion ports (not shown), a first master clock ("CLK-A") 134 and a first state machine ("SM") 148. The input digital audio streams 1 through N propagating from the input cards 136-1 through 136-N are transmitted to the routing engine 140 and the transmission expansion port 146. Operation of the routing engine 140 and the transmission expansion port 146 are described in greater detail in co-pending U.S. patent application Ser. No. 10/518,212 and previously incorporated by reference. Briefly, however, the N input digital audio data streams received by the transmission expansion port 146 are forwarded to the primary router matrix card 104a of the second router matrix component 104, the primary router matrix card 106a of the third router matrix component 106 and the primary router matrix card 108a of the fourth router matrix component 108. The router matrix cards 104a, 106a and 108a are similarly provided with a transmission expansion port which transmit input digital audio data streams N+1 through 2N, 2N+1 through 3N and 3N+1 through 4N respectively received thereby to the routing engine 140.

Together with the input digital audio data streams N+1 through 2N, 2N+1 through 3N and 3N+1 through 4N received from the second, third and fourth broadcast router components 104, 106 and 108, respectively, the input digital audio streams 1 through N output by the input cards 136-1 through 136-N are provided as inputs to the routing engine 140. Signal selection functionality residing on the routing engine A140 allows each one of the M outputs therefrom to be connected to a selected one of the 4N inputs thereto. Selection of the particular one of the 4N inputs to which each one of the M outputs is connected is controlled by control circuitry (also not shown). From the routing engine 140, each one of the M output digital audio data streams is propagated to a corresponding one of the output cards 138-1 through 138-M. Residing on each one of the output cards 138-1 through 138-M is output signal selection circuitry (not shown) which selects, from a first output digital audio data stream received from the first router matrix card 102a and a second output digital audio data stream received from the second router matrix card 102b, a digital audio data stream to be output the first broadcast router component 102.

As previously set forth, the first master clock 134 and the first state machine 148 also reside on the first router matrix card 102a of the first broadcast router component 102. As will be more fully described below, the first master clock 134 provides a first common clock signal for all clock-demanding components of the broadcast router 100. As disclosed herein, the input and output cards for each of the broadcast router components 102, 104, 106 and 108 are designated as clock-demanding components. However, the foregoing disclosure is purely exemplary and it is fully contemplated that other components, including those shown in the drawings and/or omitted therefrom for ease of illustration, may also be clock-demanding components. Accordingly, the first common clock signal generated by the first master clock 134 is tied to a clock input CLK-A of each one of the input cards 136-1 through 136-N and the output cards 138-1 through 138-M. The first common clock signal generated by the first master clock 134 is also passed to the second broadcast router component 104 via the link 110 where it is tied to a clock input CLK-A of each one of the input cards 142-1 through 142-N and the output cards 144-1 through 144-M. It is contemplated that the first common clock signal generated by the first master clock 134 may be distributed to other broadcast router components, for example, the broadcast router component 104, using a variety of techniques. Preferably, the first-master clock forwards the first common clock signal CLK-A to the transmission expansion port 146 where it is be added to the data signal being transmitted over the link 110 to the receiving expansion ports residing on the primary router matrix card 104*a*. Upon arrival of the data signal at the primary router matrix card 104*a*, the first common clock signal CLK-A is extracted from the data signal for subsequent distribution to the clock-demanding components of the primary router matrix card 104*a*. Alternately, it is contemplated that the first common clock signal CLK-A may be transmitted over the link 110 using a discrete line, for example, a conductive wire or optical fiber, to exclusively carry the first common clock signal by adding a line to the existing line or lines which individually or collectively form the link 110, for example, by intertwining the line carrying the first common clock signal with the lines carrying the digital audio data signals 1 through N from the transmission expansion port 146 to the second broadcast router component 104. In a similar fashion, the output of the first master clock 134 is also passed to the third and fourth broadcast router components 106 and 108 via the links 112 and 114, respectively, for distribution of the first common clock signal to all of the input and output cards thereof as well. Of course, while FIG. 2 shows only input and output cards as clock-demanding components, it is fully contemplated that other components of the first broadcast router component 102 illustrated in FIG. 2, as well as components of the first broadcast router component 102 omitted from FIG. 2 for ease of illustration may also be clock-demanding components having a CLK-A input to be coupled to the second master clock 134.

The first master clock 134 is controlled by the first state machine 148. As may be further seen in FIG. 2, the state machine 148 has a first input coupled to the routing engine 140, a second input coupled to the transmission expansion port 146, a third input coupled to a routing engine 150 residing on the redundant router matrix card 104*b* of the second broadcast router component 104, a fourth input coupled to a transmission expansion port 152 residing on the redundant router matrix card 104*b* of the second broadcast router component 104 and an output coupled to the first master clock 134. As disclosed herein, the third and fourth inputs to the state machine 148 which originate at the second router matrix card 104*b* of the second broadcast router component 104 are coupled to the state machine 148 via the links 110 and 122, respectively. It is fully contemplated, however, that the third and fourth inputs may instead by coupled to the state machine 148 via the other one of the links or, if desired, both inputs may be coupled to the state machine 148 by either the link 110 or the link 122. Furthermore, while precise details of the operation of the state machine 148 will be more fully described below, briefly, the first state machine 148 selectively activates/deactivates the first master clock 134 based upon the operating condition for the routing engine 140, the transmission expansion port 146, the routing engine 150 and the transmission expansion port 152 coupled to the first, second, third and fourth inputs thereto.

Of the four components of the primary router matrix card 102*a* illustrated in FIG. 2, the redundant router matrix card 102*b* includes only a transmission expansion port (not shown) coupled to receive digital audio data input signals 1 through N from the input cards 136-1 through 136-N and a routing engine (also not shown) coupled to receive digital audio data signals 1 through N from the input cards 136-1 through 136-N, digital audio data signals N+1 through 2N from the redundant router matrix card 104*b* via the link 122, digital audio signals 2N+1 through 3N from the redundant router matrix card 106*b* via the link 124 and digital audio signals 3N+1 through 4N from the redundant router matrix card 108*b* via the link 126. The routing engine further includes M outputs coupled to output cards 1 through M, respectively. Signal selection functionality residing within the routing engine each one of the M outputs therefrom to be connected to a selected one of the 4N inputs thereto. The routing engine 140 residing on the primary router matrix card 102*a* and the routing engine residing on the redundant router matrix card 102*b* are identically controlled so that the M output digital audio data streams for the primary router matrix card 102*a* are the same as the M output digital audio data streams for the redundant router matrix card 102*b*.

Figure 3:
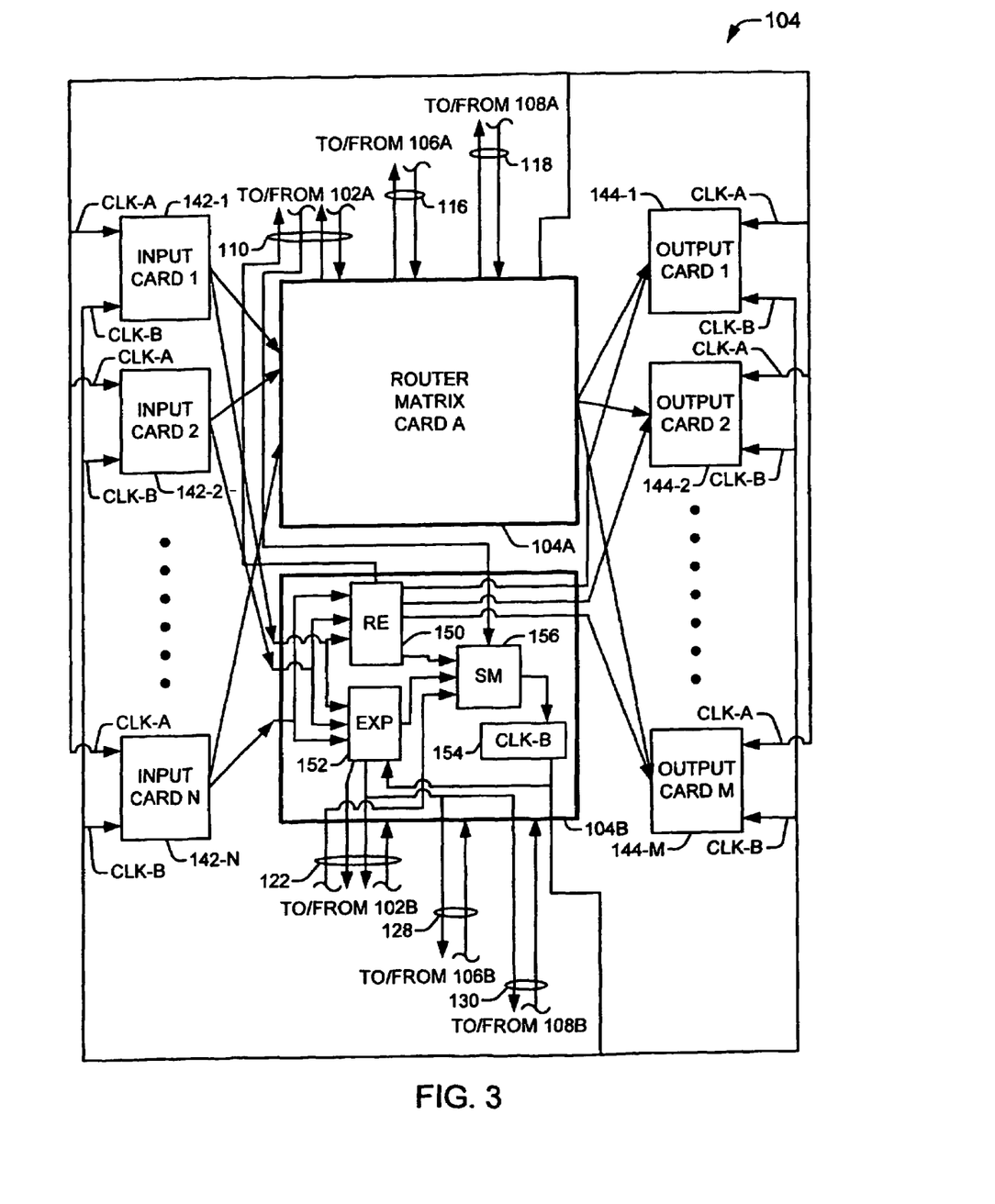
FIG. 3 is an expanded block diagram of a second broadcast router component of the fully redundant, linearly expandable broadcast router of FIG. 1.

FIG. 3 shows the second broadcast router component 104. As previously set forth, the second broadcast router component 104 includes a primary router matrix card 104*a* and a redundant router matrix card 104*b*, each of which are slideably received within and supportably mounted by the chassis 104*c* (not shown in FIG. 3) of the second broadcast router component 104. Also slideably received within and supportably mounted by the chassis 104 are input cards 142-1 through 142-N and output cards 144-1 through 144-M. Each input card 142-1 through 142-N is coupled to the primary router matrix card 104*a* and the redundant router matrix card 104*b*. Likewise, each output card 144-1 through 144-M is coupled to the primary router matrix card 104*a* and the redundant router matrix card 104*b*. Of course, while discrete input and output cards 142-1 through 142-N and 144-1 through 144-M are shown in FIG. 3, it should be clearly understood that, if desired, the functionality residing on both the input and output cards card, for example, the input card 142-1 and the output card 144-1 may instead be placed on a single I/O card. Furthermore, while FIG. 3 shows discrete input and output cards 142-1 through 142-N and 144-1 through 144-M, it is fully contemplated that, depending on available space thereon, all or part of the functionality shown as residing on either the input cards, for example, the input card 142-1, the output cards, for example, the output card 144-1, or both, may instead reside on the primary router matrix card 104*a*, the redundant router matrix card 104*b* or some combination thereof.

Residing on each input card 142-1 through 142-N is input signal selection circuitry (not shown). The input signal selection circuitry selects, from plural input signals received thereby, an input signal to be passed to both the primary router matrix card 104*a* and the redundant router matrix card 104*b*. Typically, the input selection circuitry is used to select between an input digital audio data stream conforming to the AES-11 standard and an input digital audio data stream conforming to the MADI standard set forth in the AES-10 standard. Again, in this regard, it should be noted that a MADI input digital audio data stream may contain up to 32 AES digital audio data streams and that each of the inputs to the input selection circuitry would typically contain a single AES digital audio data stream which had previously been extracted from a MADI input digital audio data stream by extraction circuitry (also not shown). Of course, such a configuration is purely exemplary and it is fully contemplated that plural ones of the N+1 through 2N input digital audio data streams may be received from a single one of the input cards 142-1 through 142-N.

As the input selection circuitry residing on each one of the input cards 142-1 through 142-N selects an input digital audio data stream to be transmitted to each one of the primary and redundant router matrix cards 104a and 104b, each one of the primary and redundant router matrix cards 104a and 104b receive, from the input cards 142-1 through 142-N, input digital audio signals N+1 through 2N, respectively. Residing on the redundant router matrix card 104b are the routing engine 150, the transmission expansion port 152, first, second and third receiving expansion ports (not shown), a second master clock ("CLK-B") 154 and a state machine 156. The input digital audio streams N+1 through 2N propagating from the input cards 142-1 through 142-N, respectively, are transmitted to the routing engine 150 and the transmission expansion port 152. As previously noted, operation of the routing engine 150 and the transmission expansion port 152 are described in greater detail in co-pending U.S. patent application Ser. No. 10/518,212 and previously incorporated by reference. Briefly, however, the input digital audio data streams N+1 through 2N received by the transmission expansion port 152 are forwarded to the redundant router matrix card 102b of the first router matrix component 102, the redundant router matrix card 106b of the third router matrix component 106 and the redundant router matrix card 108b of the fourth router matrix component 108. The router matrix cards 102b, 106b and 108b are similarly provided with a transmission expansion port which transmit input digital audio data streams 1 through N, 2N+1 through 3N and 3N+1 through 4N respectively received thereby to the routing engine 150.

Together with the input digital audio data streams 1 through N, 2N+1 through 3N and 3N+1 through 4N received from the first, third and fourth broadcast router components 102, 106 and 108, respectively, the N+1 through 2N input digital audio streams propagating from the input cards 142-1 through 142-N are provided as inputs to the routing engine 150. Signal selection functionality residing on the routing engine 150 allows each one of the M outputs therefrom to be connected to a selected one of the 4N inputs thereto. Selection of the particular one of the 4N inputs to which each one of the M outputs is connected is controlled by control circuitry (also not shown). From the routing engine 150, each one of the M output digital audio data streams is propagated to a corresponding one of the output cards 144-1 through 144-M. Residing on each one of the output cards 144-1 through 144-M is output signal selection circuitry (not shown) which selects, from a first output digital audio data stream received from the first router matrix card 104a and a second output digital audio data stream received from the second router matrix card 104b, a digital audio data stream to be output the second broadcast router component 104.

As previously set forth, the second master clock 154 and the state machine 156 also reside on the second router matrix card 104b of the second broadcast router component 104. As will be more fully described below, the second master clock 154 provides a second, redundant, common clock signal for all clock-demanding components of the broadcast router 100. Accordingly, the output of the second master clock 154 is tied to a clock input CLK-B of each one of the input cards 142-1 through 142-N and the output cards 144-1 through 144-M. The output of the second master clock 154 is also passed to the first broadcast router component 102 via the link 122-where it is tied to a clock input CLK-B of each one of the input cards 136-1 through 136-N and the output cards 138-1 through 138-M. Preferably, the second master clock 154 -forwards the second common clock signal CLK-B to the transmission expansion port 152 where it is be added to the data signal being transmitted over the link 122 to the receiving expansion ports residing on the primary router matrix card 102a. Upon arrival of the data signal at the primary router matrix card 102a, the second common clock signal CLK-B is extracted from the data signal for subsequent distribution to the clock-demanding components of the primary router matrix card 102a. Alternately, it is contemplated that the second common clock signal CLK-B may be transmitted over the link 124 using a discrete line, for example, a conductive wire or optical fiber, to exclusively carry the second common clock signal by adding a line to the existing line or lines which individually or collectively form the link 124, for example, by intertwining the line carrying the first common clock signal with the lines carrying the digital audio data signals N+1 through 2N from the transmission expansion port 152 to the first broadcast router component 104. Similarly, the output of the second master clock 154 is also passed to the third and fourth broadcast router components 106 and 108 via the links 128 and 130, respectively, for distribution to all of the input and output cards thereof as well. Of course, while FIG. 3 shows only input and output cards as clock-demanding components, it is fully contemplated that other components of the second broadcast router component 104 illustrated in FIG. 3, as well as components of the second broadcast router component 104 omitted from FIG. 3 for ease of illustration may also be clock-demanding components having a CLK-B input to be coupled to the second master clock 154. It should be kept in mind, however, that all clock-demanding components of the multi-chassis, fully redundant, linearly expandable broadcast router 100 should be configured to include both CLK-A and CLK-B inputs respectively coupled to the first master clock 134 and the second master clock 154, respectively.

The second master clock 154 is controlled by the state machine 156. As may be further seen in FIG. 3, the state machine 156 has a first input coupled to the routing engine 150, a second input coupled to the transmission expansion port 152, a third input coupled to the routing engine 140 residing on the primary router matrix card 102a of the first broadcast router component 104, a fourth input coupled to the transmission expansion port 146 residing on the primary router matrix card 102a of the first broadcast router component 102 and an output coupled to the second master clock 154. As disclosed herein, the third and fourth inputs to the state machine 156 which originate at the first router matrix card 102a of the first broadcast router component 102 are coupled to the state machine 156 via the links 122 and 110, respectively. It is fully contemplated, however, that the third and fourth inputs may instead by coupled to the state machine 156 via the other one of the links or, if desired, both inputs may be coupled to the state machine 156 by either the link 110 or the link 122. Furthermore, while precise details of the operation of the state machine 156 will be more fully described below, briefly, the state machine 156 selectively activates/deactivates the second master clock 154 based upon the operating conditions for the routing engine 150, the transmission expansion port 152, the routing engine 140 and the transmission expansion port 146 coupled thereto.

Of the four components of the redundant router matrix card 104b illustrated in FIG. 3, the primary router matrix card 104a includes only a transmission expansion port (not shown) coupled to receive digital audio data input signals N+1 through 2N from the input cards 142-1 through 142-N and a routing engine (also not shown) coupled to receive digital audio data signals N+1 through 2N from the input cards 142-1 through 142-N, digital audio data signals 1 through N from the primary router matrix card 102a via the link 110, digital audio signals 2N+1 through 3N from the primary router matrix card 106a via the link 116 and digital audio signals 3N+1 through 4N from the primary router matrix card 108a via the link 118. The routing engine further includes M outputs coupled to output cards 1 through M, respectively. Signal selection functionality residing within the routing engine each one of the M outputs therefrom to be connected to a selected one of the 4N inputs thereto. The routing engine 150 residing on the redundant router matrix card 104b and the primary engine residing on the first router matrix card 104a are identically controlled so that the M output digital audio data streams for the primary router matrix card 104a are the same as the M output digital audio data streams for the redundant router matrix card 104b.

The third and fourth broadcast router components 106 and 108 are generally identical to one another and somewhat similar to the first and second broadcast router components 102 and 104. As previously set forth, the third broadcast router component 106 includes a primary router matrix card 106a and a redundant router matrix card 106b, each of which are slideably received within and supportably mounted by the chassis 106c. Similarly, the fourth broadcast router component 108 includes a primary router matrix card 108a and a redundant router matrix card 108b, each of which are slideably received within and supportably mounted by the chassis 108c. The primary and redundant router matrix cards 106a and 106b of the third broadcast router component 106, as well as the primary and redundant router matrix cards 108a and 108b of the fourth broadcast router component 108 are similarly generally identically configured to the redundant router matrix card 102b of the first broadcast router component 102 and/or the primary router matrix card 104a of the second broadcast router component 104. In other words, the primary router matrix cards 106a and 108a, as well as the redundant router matrix cards 106b and 108b all include a transmission expansion port, a routing engine and plural receiving expansion ports but include neither a master clock nor a state machine.

Each of the third and fourth broadcast router components 106 and 108 further include N input cards and M output cards, all of which are slideably received within and supportably mounted by the chassis 106c and 108c, respectively. Each input and output card of the third broadcast router component 106 is coupled to each one of the primary router matrix card 106a and the redundant router matrix card 106b. Similarly, each input and output card of the fourth broadcast router component 108 is coupled to each one of the primary router matrix card 108a and the redundant router matrix card 108b. Like the input and output cards of the first and second broadcast router components 102 and 104, each input and output card of the third and fourth broadcast router components 106 and 108 include both a CLK-A input and a CLK-B input tied to the first and second master clocks 134 and 154, respectively. More specifically, the input and output cards of the third broadcast router component 106 are tied to the first master clock 134 via the link 112 and to the second master clock 154 via the link 128 while the input and output cards of the fourth broadcast router component 108 are tied to the first master clock 134 via the link 114 and to the second master clock 154 via the link 130.

As previously set forth, the clock-demanding components residing in each chassis 102c, 104c, 106c and 108c of the multi-chassis broadcast router 100 are coupled to receive a common clock signal, for example, the CLK-A signal generated by the first master clock 134. The clock-demanding components residing in each chassis 102c, 104c, 106c and 108c of the broadcast router 100 are further coupled to receive a redundant common clock signal, for example, the CLK-B signal generated by the second master clock 154. Redundancy is handled in such a way, however, that any router matrix card, for example, the router matrix card 102a, or any chassis, for example, the chassis 104b can fail without causing the entire broadcast router 100 to fail. Table I, below, illustrates the logic implemented to enable this result. As used in Table I, below, a router matrix card for a broadcast router component is deemed to be "OK" when the router matrix card is both present and running. Further, a transmission expansion port is deemed to be "locked" when the frequency of the clock signal received from the master clock which resides, with the transmission expansion port, on a router matrix card, is relatively constant.

TABLE I

| Primary Router Matrix Card 102a OK | TX Port 146 Locked | Redundant Router Matrix Card 104b OK | TX Port 152 Locked | Master Clock | Router Status |
| --- | --- | --- | --- | --- | --- |
| Yes | Yes | Don't Care | Don't Care | Clock 134 | Full |
| Yes | No | Yes | Yes | Clock 154 | Full |
| No | Don't Care | Yes | Yes | Clock 154 | Full |
| Yes | No | Yes | No | Clock 134 | Partial |
| No | Don't Care | Yes | No | Clock 154 | Partial |
| No | Don't Care | No | Don't Care | None | None |

As previously set forth, by implementing redundancy of the common clock signal in accordance with the requirements set forth in Table I, any router matrix card, for example, the router matrix card 102a or any chassis, for example, the chassis 104c, can fail without causing the entire broadcast router 100 to fail. More specifically, if the first broadcast router 102 is working properly, i.e., the router matrix card 102a is okay and the transmission expansion port 146 is locked, the first master clock 134 distributes clock signal CLK-A as a common clock signal to all of the clock-demanding components of the multi-chassis broadcast router 100, thereby enabling the multi-chassis broadcast router 100 to operate at full status. If, however, the primary router matrix card 102a fails due to the transmission expansion port 146 becoming unlocked, while the first master clock can still generate the clock signal CLK-A, the clock signal can no longer be distributed throughout the multi-chassis broadcast router 100. In this situation, if the redundant router matrix card 104b is okay and the transmission expansion port 152 is locked, the second master clock 154 can distribute the clock signal CLK-B as a common clock signal to all of the clock-demanding components of the multi-chassis router 100, thereby enabling the multi-chassis broadcast router 100 to continue operating at full status. Similarly, if the primary router matrix card 102 has failed, for example, if the primary router matrix card 102a is missing, the first master clock 134 will be unable to supply the clock signal clock-A. Under this scenario, regardless of whether the transmission expansion port 146 is locked, the second master clock 154 shall, if the redundant router matrix card 104b is okay and the transmission expansion port 152 is locked, again distribute the clock signal CLK-B as a common clock signal to all of the clock-demanding components of the multi-chassis router 100, thereby enabling the multi-chassis broadcast router 100 to continue operating at full status.

If the primary router matrix card 102a is okay but neither transmission expansion port 146 nor transmission expansion port 152 are locked, the first master clock 134 shall be the master clock for-the multi-chassis broadcast router 100. While the first master clock 134 is still able to generate the clock signal CLK-A, the clock signal CLK-A cannot be distributed to the other chassis of the multi-chassis broadcast router 100. As only the clock-demanding components of the broadcast router component 102 will have a common clock signal, the multi-chassis broadcast router 100 will be operating at partial status. If, on the other hand, the primary router matrix card 102a has failed, the redundant router matrix card 104b remains okay, but the transmission expansion port 152 is not locked, the second master clock 154 shall be the master clock for the multi-chassis broadcast router 100. While the second master clock 154 is still able to generate the clock signal CLK-B, the clock signal CLK-B cannot be distributed to the other chassis of the multi-chassis broadcast router 100. As only the clock-demanding components of the broadcast router component 104 will have a common clock signal, the multi-chassis broadcast router 100 will again be operating at partial status. Finally, if both the primary router matrix card 102a and the redundant router matrix card 104b have failed, there will be no master clock for the multi-chassis broadcast router and, as there will not be a common clock signal available for the clock-demanding components of the multi-chassis broadcast router 100, the multi-broadcast router 100 will completely fail.

Table I, above, may be implemented using Boolean logic. However, by doing so, less than ideal behavior may occur. It is highly desirable to have the removal or insertion of primary or redundant router matrix cards not to cause any flaws in the outputs of the router. Use of a non-glitching clock mux circuits for switches between locked and not locked states and for switching between clocks will eliminate most problems. The problem is caused when master clocks 134 and 154 have slightly different frequencies. When a router matrix card is removed or fails, this result is unavoidable. However, insertion of a router matrix card does not necessarily have to result in this problem. In other words, it is advantageous if a newly inserted router matrix card does not become the master until needed.

Figure 4:
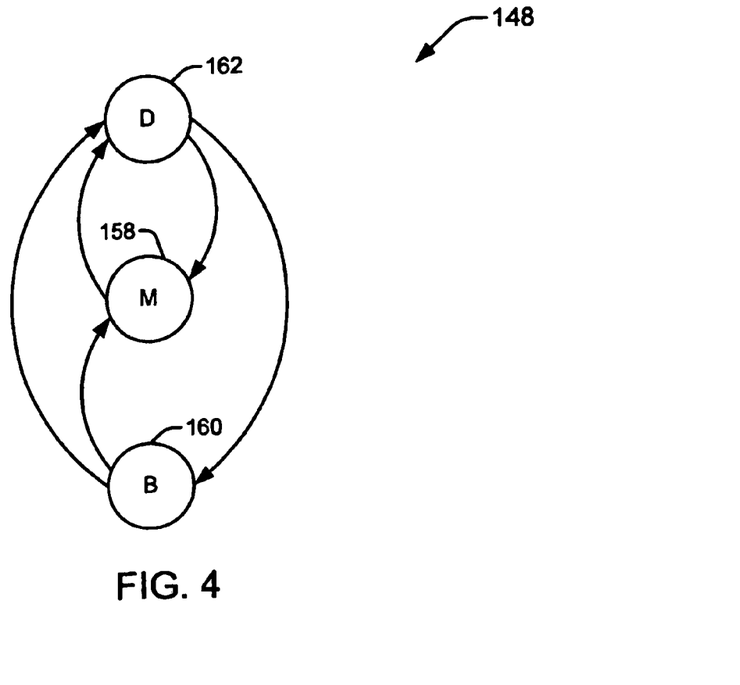
FIG. 4 is a state diagram for a state machine of the first broadcast router component of FIG. 2.
Figure 5:
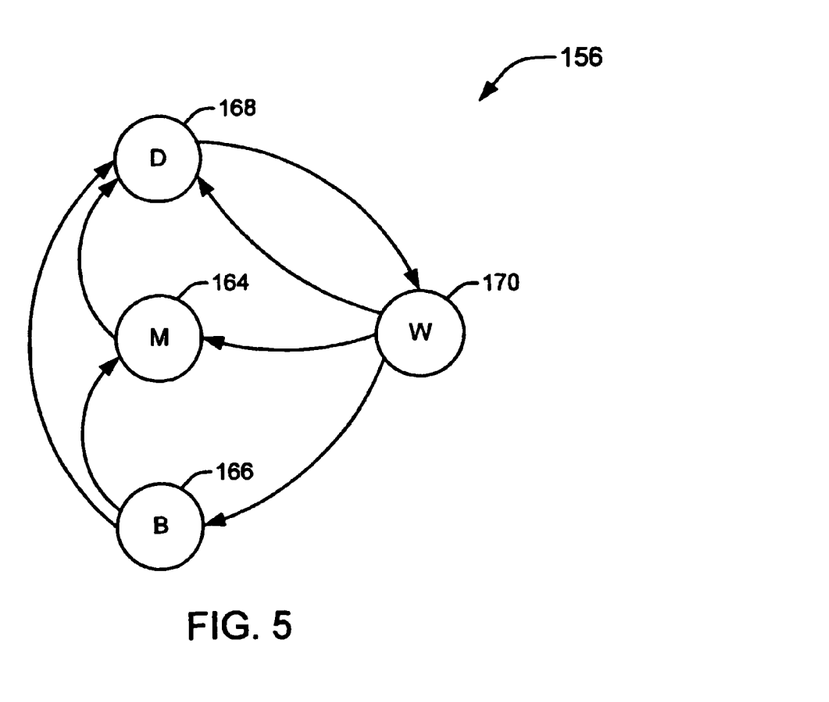
FIG. 5 is a state diagram for a state machine of the second broadcast router component of FIG. 4.

An exemplary logical implementation of Table I, above is shown in the state diagrams illustrated in FIGS. 4 and 5. More specifically, the first state machine 148 has three states, a first ("master" (or "M")) state 158 in which the first state machine 148 issues an instruction to the first master clock 134 to issue the signal CLK-A to all of the clock-demanding components of the multi-chassis broadcast router 100, a second ("backup" (or "B")) state 160 where the first state machine 148 issues an instruction to the-first master clock 134 not to issue the signal CLK-A to all of the clock-demanding components of the multi-chassis broadcast router 100 and a third ("dead" (or "D")) state 162 where the first state machine 148 will again issue an instruction to the first master clock 134 not to issue the signal CLK-A to all of the clock-demanding components of the multi-chassis broadcast router 100. Initially, the first state machine is in the first state 158. In this state, the input from the routing engine 140 indicates that first router matrix card 102a is present and running and the input from the transmission expansion port 146 indicates that it is locked. The inputs from the routing engine 150 and the transmission expansion port 152 are irrelevant. In the first state 158, the first state machine 148 issues a signal to the first master clock 158 instructing the first master clock 158 to provide the common clock signal CLK-A to all of the clock-demanding components of the multi-chassis broadcast router 100. Furthermore, as all of the clock-demanding components of the multi-chassis broadcast router 100 are receiving the common clock signal CLK-A from the first master clock 134, the status of the broadcast router is "FULL", i.e., all of the broadcast router components 102, 104, 106 and 108 are operating.

Regardless of operating conditions for the second master clock 154, the first master clock 134 will continue to supply the common clock signal CLK-A until either the routing engine 140 or the transmission expansion port 146 fail. A routing engine failure occurs if the input from the routing engine 140 changes such that it now indicates that the first router matrix card 102a is either absent or no longer running. A transmission expansion port failure occurs if the input from the transmission expansion port 146 indicates that the clock signal is no longer constant. If either of these conditions occurs, the first state machine 140 will transition to the third state 162. In this state, the first state machine 148 issues a signal to the first master clock 134 not to distribute the common clock signal CLK-A to the clock-demanding components of the multi-chassis broadcast router 100. As may be seen in Table I, whether or not all, part or none of the clock-demanding components of the broadcast router 100 will have a common clock signal will depend on the state of the second state machine 156.

From the third state 162, the first state machine 148 will transition to either the first state 158 or the second state 160. This transition will occur when the input from the routing engine 140 again indicates that the first router matrix card 102a is present and running and the input from the transmission expansion port 146 again indicates that the port is locked. The particular transition that will occur depends on the condition of the second state machine 156. More specifically, if the second state machine 156 is in a first ("master") state 164, the second state machine 156 is currently issuing a signal to the second master clock 154 to distribute the common clock signal CLK-B to the clock-demanding components of the broadcast router 100. If the second master clock 154 is distributing the common clock signal CLK-B, the third and fourth inputs to the first state machine 148 will indicate that the redundant router matrix card 104b is okay and the transmission expansion port 152 is locked. In response, the first state machine 148 will transition to the third state 160 where it will issue an instruction to the first master clock 134 to not distribute the common clock signal CLK-A. If, however, the second state machine 156 is in any other state, the first state machine 148 will transition to the first state 158 where it will again issue a signal to the first master clock 134 to distribute the common clock signal CLK-A.

From the second state 160, the first state machine 148 will transition to either the third state 162 or the first state 158. The transition to the third state 162 can occur independent of the second state machine 156. Specifically, the first state machine 148 will transition to the third state 162 if the first input thereto indicates that the routing engine 140 has failed or if the second input thereto indicates that the transmission expansion port 146 has failed. The transition to the first state 158, on the other hand, can only occur as a result of the second state machine 156 undergoing a transition. Specifically, if the second state machine 156 transitions from the first state 164 to a third state 168, the third or fourth inputs to the first state machine 148 will indicate that the redundant router matrix card 104b is not okay and/or the transmission expansion port 146 is not locked.

Referring next to FIG. 5, the state machine has four states, the first state 164 in which the second state machine 156 issues an instruction to the second master clock 154 to issue the signal CLK-B to all of the clock-demanding components of the multi-chassis broadcast router 100, a second state 166 where the second state machine 156 issues an instruction to the second master clock 154 not to issue the signal CLK-B to all of the clock-demanding components of the multi-chassis broadcast router 100, the third state 168 where the second state machine 156 will again issue an instruction to the second master clock 154 not to issue the signal CLK-B to all of the clock-demanding components of the multi-chassis broadcast router 100 and a fourth ("wait" (or "W")) state 160 in which the second state machine 156 again issues an instruction to the second master clock 154 not to issue the signal CLK-B to all of the clock-demanding components of the multi-chassis broadcast router 100. Initially, the second state machine 156 is in the second state 158. In this state, the input from the routing engine 140 indicates that primary router matrix card 102a is present and running and the input from the transmission expansion port 146 indicates that it is locked. Similarly, the inputs from the routing engine 150 indicates that the redundant router matrix card 104b is present and running and the input from the transmission port 152 indicates that it is locked. In the second state 166, the second state machine 156 issues a signal to the second master clock 154 instructing the second master clock 154 not to provide the common clock signal CLK-B to all of the clock-demanding components of the multi-chassis broadcast router 100.

From the second state 166, the second state machine may transition to either the third state 168 or the first state 164. Transition to the third state 168 may occur regardless of the state of the first state machine 148. More specifically, the state machine 156 will transition to the third state 168 if the input from the routing engine 150 indicates that the redundant router matrix card 150 has failed or the input from the transmission expansion port 156 indicates it is no longer locked. In the third state 168, the state machine 156 will again issue an instruction to the second master clock 154 instructing the master clock 154 not to distribute the common clock signal CLK-B to the clock-demanding components of the multi-chassis broadcast router 100. Conversely, the second state machine 166 can only transition from the second state 166 to the first state 164 upon transition of the first state machine 148 from either the first state 158 or the second state 160 into the third state 162. The second state machine 156 will be advised that such a transition has occurred upon the input from the routing engine 140 indicating that the primary router matrix card 102a has failed or the input from the transmission expansion port 146 indicating that the clock signal is no longer constant. If either of these conditions occurs, the second state machine 156 will transition from the second state 166 to the first state 164. In this state, the second state machine 156 issues a signal to the second master clock 154 to distribute the common clock signal CLK-B to the clock-demanding components of the multi-chassis broadcast router 100.

From the first state 164, the second state machine 156 may only transition to the third state 168. This transition can only occur upon transition of the first state machine 148 from either the first state 158 or the second state 160 into the third state 162. The second state machine 156 will be advised that such a transition has occurred upon the input from the routing engine 140 indicating that the primary router matrix card 102a has failed or the input from the transmission expansion port 146 indicating that the clock signal is no longer constant. If either of these conditions occurs, the second state machine 156 will transition from the first state 164 to the third state 168. In this state, the second state machine 156 issues a signal to the second master clock 154 to not distribute the common clock signal CLK-B to the clock-demanding components of the multi-chassis broadcast router 100.

From the third state 168, the second state machine 156 may only transition to the fourth state 160. This transition can only occur upon the input from the routing engine 150 indicating that the redundant router matrix card 104b is present and running and/or the input from the transmission expansion port 152 indicating that the port is locked. In the fourth state 170, the second state machine 156 will issue a signal to the second master clock 154 not to distribute the common clock signal CLK-B to the clock-demanding components of the broadcast router 100. Finally, from the fourth state 170, the second state machine 156 may transition to any one of the first, second or third states 164, 166 or 168. More specifically, the second state machine 156 will transition to the first state 164 if the input from the routing engine 140 indicates that the primary router matrix card has failed and/or the input from the transmission expansion port 146 indicates that the port is not locked. Conversely, the second state machine 170 will transition to the second state 166 if the input from the routing engine 140 indicates that the primary router matrix card 102a is present and running and the input from the transmission expansion port 146 indicates that the port is locked. Finally, the second state machine 170 will transition to the third state 168 if the input from the routing engine 150 indicates that the redundant router matrix card 104b has failed and/or the input from the transmission expansion port 152 indicates that the port is not locked.

Of course, while preferred embodiments of this invention have been shown and described herein, various modifications and other changes can be made by one skilled in the art to which the invention pertains without departing from the spirit or teaching of this invention. Accordingly, the scope of protection is not limited to the embodiments described herein, but is only limited by the claims that follow.

The invention claimed is:

1. A multi-chassis broadcast router, comprising:
   a first chassis in which a first routing engine and at least one clock-demanding component reside;
   a second chassis in which a second routing engine and at least one clock-demanding component reside;
   a first link coupling an input side of said first routing engine residing in said first chassis and an input side of said second routing engine residing in said second chassis; and
   a master clock residing in said first chassis, said master clock coupled to said at least one clock-demanding component residing in said first chassis and to said at least one clock-demanding component residing in said second chassis via said first link, said master clock supplying said at least one clock-demanding component residing in said first chassis and said at least one clock-demanding component residing in said second chassis with a common clock signal.

2. The router of claim 1, and further comprising:
a first router matrix card supportably mounted by said first chassis, said first routing engine and said master clock residing on said first router matrix card; and
wherein said at least one clock demanding component residing in said first chassis further comprises at least one input card.

3. The router of claim 1, and further comprising:
a third chassis in which a third routing engine and at least one clock-demanding component reside;
a second link coupling said input side of said first routing engine residing in said first chassis and an input side of said third routing engine residing in said third chassis, said master clock residing in said first chassis coupled to said at least one clock-demanding component residing in said third chassis via said second link;
wherein said master clock residing in said first chassis supplies said at least one clock-demanding component residing in said third chassis with said common clock signal.

4. The router of claim 3, and further comprising:
a third link coupling said input side of said second routing engine residing in said second chassis and said input side of said third routing engine residing in said third chassis;
wherein said first routing engine residing in said first chassis, said second routing engine residing in said second chassis and said third routing engine residing in said third chassis are arranged in a fully connected topology.

5. The router of claim 4, wherein a redundant routing engine resides in each one of said first, second and third chassis.

6. The router of claim 5, and further comprising:
a fourth link coupling an input side of said redundant routing engine residing in said first chassis to an input side of said redundant routing engine residing in said second chassis;
a fifth link coupling said input side of said redundant routing engine residing in said first chassis to an input side of said redundant routing engine residing in said third chassis; and
a sixth link coupling said input side of said redundant routing engine residing in said second chassis to said input side of said redundant routing engine residing in said third chassis;
wherein said redundant routing engine residing in said first chassis, said redundant routing engine residing in said second chassis and said redundant routing engine residing in said third chassis are arranged in a second fully connected topology.

7. A multi-chassis broadcast router, comprising:
a first chassis, said first chassis supportably mounting a first router matrix card, a redundant router matrix card, at least one clock-demanding input card and at least one clock-demanding output card;
a second chassis, said second chassis supportably mounting a first router matrix card, a redundant router matrix card, at least one clock-demanding input card and at least one clock-demanding output card;
a first master clock residing on said first router matrix card supportably mounted within said first chassis, said first master clock coupled to said at least one clock-demanding input card and said at least one clock-demanding output card supportably mounted by said first chassis and to said at least one clock-demanding input card and said at least one clock-demanding output card supportably mounted by said second chassis, said first master clock supplying said at least one clock-demanding input card and said at least one clock-demanding output card supportably mounted by said first chassis and said at least one clock-demanding input card and said at least one clock-demanding output card supportably mounted by said second chassis with a common clock signal;
a second master clock residing on said redundant router matrix card supportably mounted within said second chassis, said second master clock coupled to said at least one clock-demanding input card and said at least one clock-demanding output card supportably mounted by said first chassis and to said at least one clock-demanding input card and said at least one clock-demanding output card supportably mounted by said second chassis, said second master clock supplying said at least one clock-demanding input card and said at least one clock-demanding output card supportably mounted by said first chassis and said at least one clock-demanding input card and said at least one clock-demanding output card supportably mounted by said second chassis with a redundant common clock signal; and
control logic coupled to said first master clock and said second master clock, said control logic determining whether said first master clock should issue said common clock signal or whether said second master clock should issue said redundant common clock signal.

8. The router of claim 7, wherein said control logic has a first input coupled to said first router matrix card supportably mounted by said first chassis and a second input coupled to said redundant router matrix supportably mounted by said second chassis, said control logic determining, based upon a first signal received via said first input and a second signal received via said second input whether said first master clock should issue said common clock signal or whether said second master clock should issue said redundant common clock signal.

9. The router of claim 8, wherein:
a first routing engine and a first transmission expansion port reside on said first router matrix card supportably mounted by said first chassis; and wherein:
a second routing engine and a second transmission expansion port reside on said redundant router matrix card supportably mounted by said second chassis.

10. The router of claim 9, wherein:
said first input to said control logic is coupled to said first routing engine residing on said first router matrix card supportably mounted by said first chassis and said second input to said control logic is coupled to said second routing engine residing on said redundant router matrix card supportably mounted by said second chassis; and wherein
said control logic has a third input coupled to said first transmission expansion port residing on said first router matrix card supportably mounted by said first chassis and a fourth input coupled to said second transmission expansion port residing on said redundant router matrix card supportably mounted by said second chassis
said control logic determining, based upon said first signal received via said first input, said second signal received via said second input, a third signal received via said third input and a fourth signal received via said fourth input, whether said first master clock should issue said common clock signal or said second master clock should issue said redundant common clock signal.

11. The router of claim 10, wherein said control logic further comprises:
   a first state machine residing on said first router matrix card supportably mounted by said first chassis;
   a second state machine residing on said redundant router matrix card supportably mounted by said second chassis;
   said first state machine determining, based upon said first signal received via said first input, said second signal received via said second input, said third signal received via said third input and said fourth signal received via said fourth input, whether said first master clock should issue said common clock signal; and
   said second state machine determining, based upon said first signal received via said first input, said second signal received via said second input, said third signal received via said third input and said fourth signal received via said fourth input, whether said second master clock should issue said redundant common clock signal;
   wherein only one of said common clock signal and said redundant common clock signal can be issued at one time.

12. A method comprising:
   supplying a common clock signal from a master clock, said master clock residing in either a first chassis or a second chassis of a multi-chassis broadcast router, the common clock signal being supplied via a link to (1) at least one clock-demanding component residing in said first chassis and (2) at least one clock-demanding component residing in said second chassis, the link coupling an input side of a first routing engine residing in said first chassis and an input side of a second routing engine residing in said second chassis.

13. The method of claim 12, wherein:
   said first chassis comprises a router matrix card, and the router matrix card includes a master clock and the first routing engine,
   said second chassis comprises a router matrix card, and the router matrix card includes a master clock and the second routing engine, and
   the method further comprises determining whether to supply said common clock signal from said master clock in said first chassis or from said master clock in said second chassis.

* * * * *